(12) United States Patent
Kuo et al.

(10) Patent No.: US 12,737,184 B2
(45) Date of Patent: Sep. 15, 2026

(54) METHOD AND SYSTEM FOR DYNAMICALLY TUNING THERMAL DESIGN POWER AND NON-TRANSITORY COMPUTER-READABLE STORAGE MEDIUM

(71) Applicant: Wistron Corporation, New Taipei City (TW)

(72) Inventors: Shu-Hao Kuo, New Taipei City (TW); Chong-Rong Huang, New Taipei City (TW); Kuan-Lin Chen, New Taipei City (TW); I-Chieh Chen, New Taipei City (TW); Kuan-Hsien Lee, New Taipei City (TW); Shing-Hang Wang, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 175 days.

(21) Appl. No.: 18/543,092

(22) Filed: Dec. 18, 2023

(65) Prior Publication Data

US 2025/0103334 A1 Mar. 27, 2025

(30) Foreign Application Priority Data

Sep. 27, 2023 (TW) ................................ 112137190

(51) Int. Cl.
*G06F 1/26* (2006.01)
*G06F 1/20* (2006.01)
*G06F 1/32* (2019.01)
*G06F 9/30* (2018.01)

(52) U.S. Cl.
CPC .......... *G06F 9/30083* (2013.01); *G06F 1/206* (2013.01)

(58) Field of Classification Search
CPC ............................ G06F 9/30083; G06F 1/206
See application file for complete search history.

(56) References Cited

U.S. PATENT DOCUMENTS

2011/0131400 A1* 6/2011 Chiu ....................... G06F 1/206 713/2
2012/0159201 A1* 6/2012 Distefano ............ G06F 1/3234 713/300
2013/0138977 A1* 5/2013 Herman ............... G06F 1/3206 713/300

(Continued)

FOREIGN PATENT DOCUMENTS

TW 202018458 A 5/2020
TW 202219698 A 5/2022

OTHER PUBLICATIONS

Examination report dated Apr. 9, 2024, listed in related Taiwan patent application No. 112137190.

*Primary Examiner* — Xuxing Chen
(74) *Attorney, Agent, or Firm* — McClure, Qualey & Rodack, LLP

(57) ABSTRACT

A method and a system for dynamically tuning thermal design power and a non-transitory computer-readable storage medium are described. The system is configured to dynamically tune turbo boost mode operation parameters of a central processing unit (CPU), independent of related settings of a turbo boost operation state of the CPU. In an embodiment, a controller is configured to send a power tuning signal to a basic input/output system (BIOS) to directly intervene and tune a real-time operating power of the CPU.

20 Claims, 5 Drawing Sheets

(56) References Cited

U.S. PATENT DOCUMENTS

| | | | | |
|---|---|---|---|---|
| 2014/0032952 | A1* | 1/2014 | Kim | G06F 1/3234 713/323 |
| 2014/0358288 | A1* | 12/2014 | Huang | H05K 7/20209 700/275 |
| 2015/0346798 | A1* | 12/2015 | Dongara | G06F 1/206 713/320 |
| 2017/0131754 | A1* | 5/2017 | Zobel | G06F 1/3206 |
| 2019/0088773 | A1* | 3/2019 | Armstrong | H10D 30/021 |
| 2019/0171263 | A1* | 6/2019 | Winkel | G06F 1/3206 |
| 2021/0109578 | A1 | 4/2021 | Umpathy et al. | |
| 2022/0326759 | A1* | 10/2022 | Wang | G06F 1/206 |
| 2024/0370078 | A1* | 11/2024 | Meza | G06F 1/3296 |
| 2025/0103334 | A1* | 3/2025 | Kuo | G06F 1/206 |

* cited by examiner

METHOD AND SYSTEM FOR DYNAMICALLY TUNING THERMAL DESIGN POWER AND NON-TRANSITORY COMPUTER-READABLE STORAGE MEDIUM

CROSS-REFERENCE TO RELATED APPLICATION

This non-provisional application claims priority under 35 U.S.C. § 119 (a) to patent application No. 112137190 filed in Taiwan, R.O.C. on Sep. 27, 2023, the entire contents of which are hereby incorporated by reference.

BACKGROUND

Technical Field

The present invention relates to a technology of dynamically tuning thermal design power (TDP), and in particular, to a method and system for dynamically tuning thermal design power of a processor in a turbo boost state and a non-transitory computer-readable storage medium.

Related Art

As known to the inventor, there are already techniques for dynamically tuning system performance of a central processing unit (CPU) based on the actual operation conditions of users, to optimize the performance of the original fixed thermal design power configuration. In the common prior art, the system may predict the upcoming workload by pre-trained the algorithm through artificial intelligence, and can boost higher power to accommodate upcoming high workload as required by the system, which may be referred to as a turbo boost mode in this case. However, when the turbo boost mode is in operation, the overclocking operation of the CPU is the top priority of the system, and a temperature protection mechanism of another electronic components or circuit cannot affect the operation of the turbo boost mechanism. In other words, even if the electronic component or circuit starts the temperature protection mechanism due to overheating, the CPU will continue to run the turbo boost mechanism autonomously without interruption.

Referring to FIG. 1, FIG. 1 is a relation diagram of powers, temperatures, and times when a CPU is in a turbo boost mode. As shown in the figure, when the CPU is operating in the turbo boost mode, a power will quickly rise to an upper power limit (approximately 135 W), and a temperature of an electronic component on a motherboard also rises rapidly and exceeds 100° C. The temperature of the electronic component slowly drops until the turbo boost mode ends. However, since the temperature of the electronic component exceeds 100° C. during the turbo boost mode, even after the turbo boost mode, there is a risk of system crashes or damage to electronic components, and in the worst case, the entire system may be destroyed.

However, the common approach taken by the system manufacturers to address this issue is to sacrifice the system performance in the turbo boost mode, such as lowering the upper power limit of the turbo boost mode of the CPU or tuning the related parameters (Tau parameters). As an example, consider a system that is configured with a fixed turbo boost mode setting, such as 20 W, 4.0 GHz, and a Tau parameter of 20 seconds. To address the issues mentioned earlier, system manufacturers might lower the power limit, for instance, to 18 W. Alternatively, they may replace electronic components with ones that can withstand higher temperatures to enhance the system's temperature tolerance, though this approach would increase costs.

SUMMARY

In view of this, embodiments of the present invention provide a method and system for dynamically tuning thermal design power (TDP) and a non-transitory computer-readable storage medium, which can dynamically tune operation parameters of a central processing unit (CPU) when being in a turbo boost mode, so as to address the issues present in the existing technology.

The method for dynamically tuning thermal design power of this embodiment of the present invention is used for dynamically tuning turbo boost mode operation parameters of the CPU. The method includes (but is not limited to): sending, by a controller, a power tuning signal to a BIOS, and performing, by the BIOS, a thermal design power setting to tune a real-time operating power of the CPU.

The system for dynamically tuning thermal design power of this embodiment of the present invention is configured to dynamically tune turbo boost mode operation parameters of the CPU. The system includes (but is not limited to) a controller and a BIOS. The BIOS is electrically coupled to the controller and the CPU. The controller is configured to execute instructions to perform the operations included in the above method.

The non-transitory computer-readable storage medium of this embodiment of the present invention stores instructions. The instructions are executed by a controller when a CPU is in a turbo boost mode to cause the controller to perform the above method.

The summary presented above does not include an exhaustive list of all aspects of the present invention. It is provided merely to introduce certain concepts and not to identify any key or essential features of the claimed subject matter.

DETAILED DESCRIPTION

Figure 1:
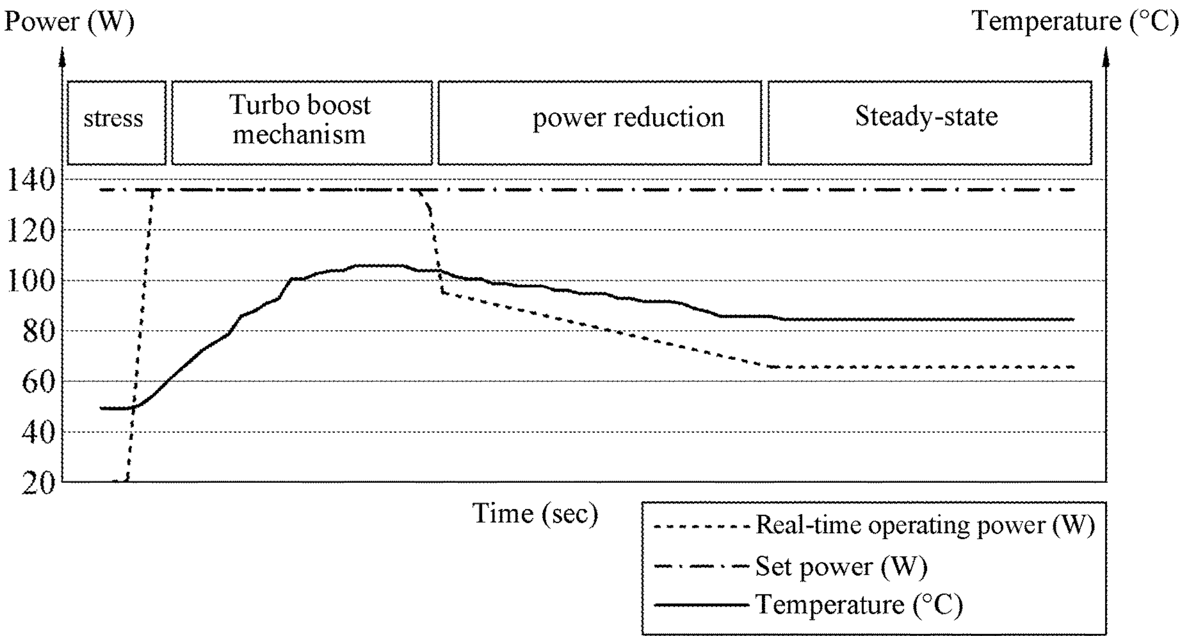
FIG. 1 is a relation diagram of powers, temperatures, and times of a CPU when being in a turbo boost operation state.

A CPU (central processing unit) being in a turbo boost mode is used as some embodiments for description below. For example, a technology used by the system manufacturers (OEMs) to dynamically tune the operation parameters of the CPU through a system software driver may be used to predict the upcoming operating load through artificial intelligence (AI) and machine learning (ML) algorithms based on real-time usage conditions, so as to dynamically tune system performance. More simply, when needed by the system, power (or clock rate) of the CPU is boosted to accelerate the processing of workloads. This approach is different from operating at a constant power level and includes but is not limited to the technology like the dynamic tuning technology (DTT) of Intel® Corporation.

The thermal design power (TDP) mentioned in this specification refers to the power consumption of the CPU under the maximum theoretical load. It also represents an upper limit of the power consumption that the CPU should not exceed to prevent the system from being overloaded and thereby causing system overheating and damage. However, as mentioned in the previous paragraph, when the CPU is in the turbo boost mode or during certain types of workloads (such as Intel® Advanced Vector Extensions), the real-time operating power of the CPU may exceed the maximum thermal design power to achieve better system performance. In the meantime, this may cause the CPU and another electronic components or circuits in the system to overheat. All embodiments of that present invention provide solutions to this problem.

In some embodiments, the CPU operates in the turbo boost mode with a second power level, such as 135 W, defined as PL2 (Power Limit). PL2 serves as the upper limit for operating power and may vary according to the specifications of different models of different manufacturers. On the other hand, during the regular operation, the CPU operates at a constant power level known as the first power level, for example, 65 W, which is referred to as PL1. PL1 represents the long-term average power and is typically set not to exceed the thermal design power (TDP) or may be directly set to the thermal design power, depending on the specifications of different models of different manufacturers.

The operation parameters of the turbo boost mode mentioned in this specification includes the second power level (PL2), a clock rate, and a Tau parameter (Turbo Time Parameter) described above. The so-called Tau parameter is the duration of the turbo boost mode operation, which is a time constant of an exponentially weighted moving average (EWMA). As an example, it is assumed that a system has been configured with (fixed) operation parameters of the turbo boost mode (for example, at PL2) defined by an OEM with values such as 135 W, 5.2 GHz, and a Tau parameter of 20 seconds. In some embodiments of the present invention, these parameters, such as the second power level (PL2), may be dynamically tuned directly in response to temperature parameters without being limited by the above operation parameters.

Figure 2:
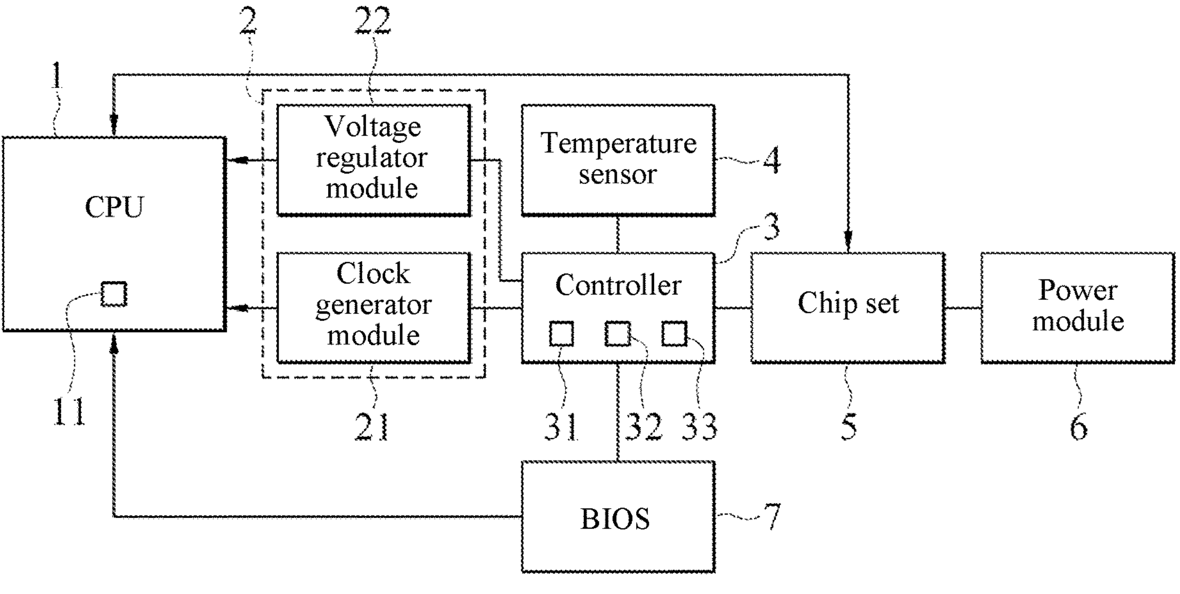
FIG. 2 is a system architecture diagram according to an embodiment of the present invention.

Referring to FIG. 2, FIG. 2 is a system architecture diagram of an embodiment of the present invention. This embodiment may be a desktop computer, a laptop, a tablet, a server, a workstation, a game console, an embedded system, and another electronic device with a processor. The embodiment shown in FIG. 2 includes a CPU 1, a plurality of electronic components 2, a controller 3, a temperature sensor 4, a chip set 5, a power module 6, and a BIOS (basic input/output system) 7.

The CPU 1 may be a complex command set computer (CISC) microprocessor, a reduced command set computer (RISC) microprocessor, a Very long command word (VLIW) microprocessor, an x86 command set compatible processor, a processor implementing a combination of command sets, a multi-core processor such as a dual-core processor or a dual-core mobile processor, or any other microprocessor.

According to FIG. 2, the electronic component 2 includes a clock generator module 21 and a voltage regulator module (VRM) 22. In some embodiments, not shown in the drawings, the electronic component 2 further includes a PWM controller, a fan controller, or other similar controllers, a hardware monitoring chip, other similar chips, an active component, a passive element, and other temperature-sensitive circuit or electronic component.

The clock generator module 21 provides an operating clock to various components, including the CPU 1, a memory, and a bus. Furthermore, the voltage regulator module 22 is configured to provide an operating voltage (Vcore) to the CPU 1, and it can also adjust the operating voltage (Vcore) to enable the CPU 1 to operate at higher or lower clock frequencies.

In some embodiments, the controller 3 can function as a board management controller, which may be an embedded controller (EC). In another embodiment, the controller 3 may alternatively be a Super I/O or a similar Baseboard Management Controller (BMC). In an embodiment, the controller 3 may include a temperature reading unit 31, a comparison unit 32, and a control unit 33. The temperature reading unit 31 is configured to measure a temperature of the electronic component 2 through the temperature sensor 4. It receives the signals transmitted by the temperature sensor 4 and interprets the signals into temperature parameters. The comparison unit 32 is configured to compare the temperature measured by the temperature reading unit 31 with a preset threshold temperature. The control unit 33 is configured to send a power reduction signal or a power recovery signal to the BIOS 7 in response to a result outputted from the comparison unit 32.

The temperature sensor 4 may be a chip temperature sensor, a thermistor, or a similar temperature sensing device arranged on a motherboard, which mainly functions to measure the temperature of a specific object (such as electronic component 2) or its surrounding components. In addition, in some embodiments, the chip set 5 may be a south bridge chip, a north bridge chip, a system-on-a-chip (SoC), or a similar chip set, which is mainly configured for signal processing and transmission between the CPU 1 and other chips, circuits, or I/O devices on the motherboard. In some embodiments, the chip set 5 is also one of the objects measured by the temperature sensor 4.

In an embodiment, the power module 6 may include, but is not limited to, a power supply and other components related to power supply or power control, for example, a power connector, a power timing module, a power phase, and a power management circuit. In an embodiment, the BIOS 7 may be composed of a FLASH ROM or an EEPROM, which may store program code and setting values. It provides essential software functionality and hardware initialization, such as hardware initialization during the boot stage and firmware services for the operating system during runtime.

Figure 3:
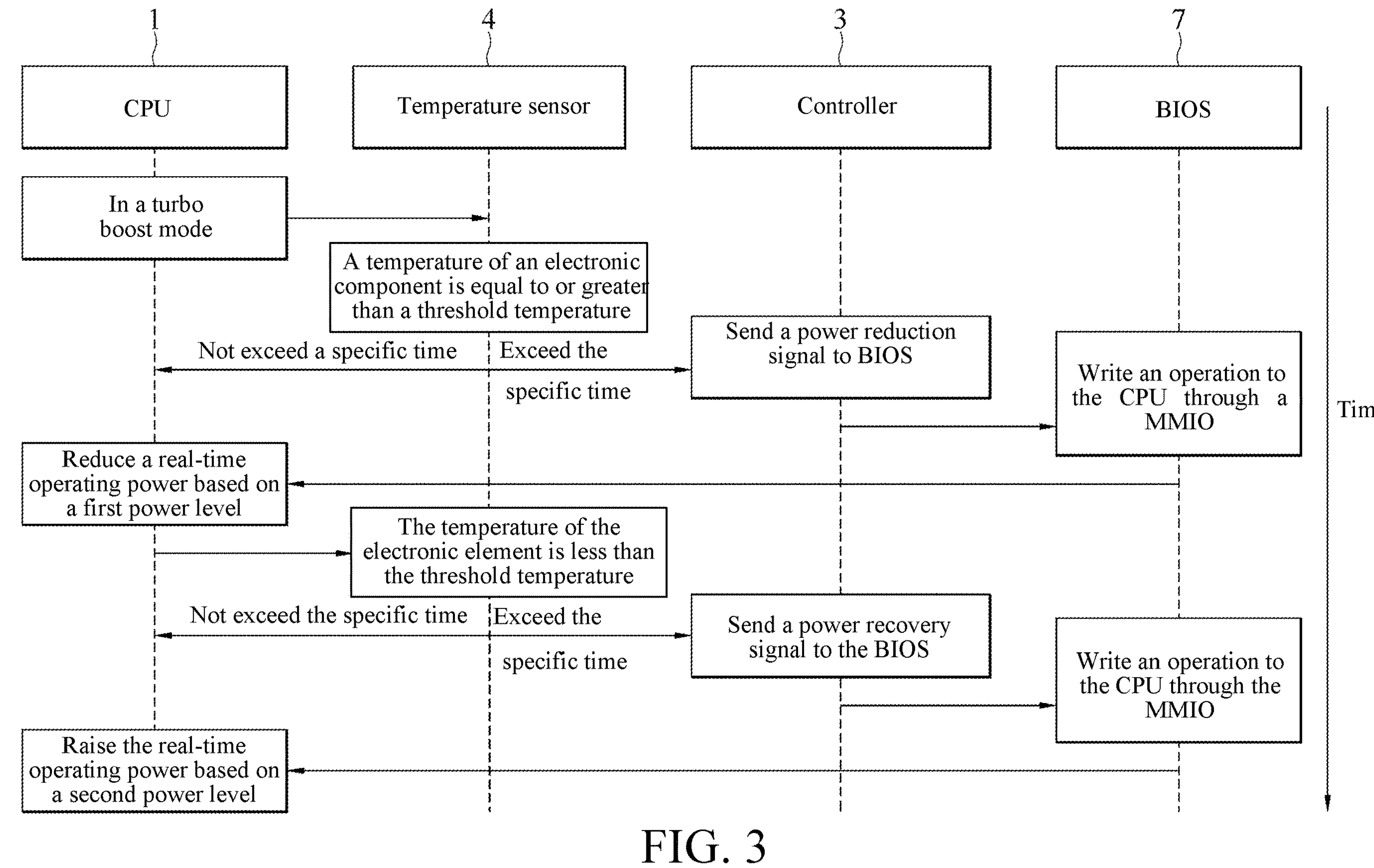
FIG. 3 is a flowchart according to an embodiment of the present invention.

Refer to FIG. 2 and FIG. 3 together. FIG. 3 is a flowchart of an embodiment of the present invention. The operation process of some embodiments is described as follows. First, when the CPU 1 is in the turbo boost mode, that is, operating at or near the second power level (PL2), where the second power level (PL2) may be 135 W or higher, or may be lower than 135 W. In this case, when the temperature of the electronic component 2 measured by the temperature sensor 4 is equal to or greater than a threshold temperature, such as 90° C., and continues for a specific duration, e.g., 3 seconds, the controller 3 uses a query scheduling and completion event command (Query event command) to send a power tuning (reduction) signal to the BIOS 7.

Moreover, the BIOS 7 is configured to cause the CPU 1 to reduce a real-time operating power based on the first power level (PL1) through a MMIO (memory-mapped input/output) write operation, for example, this action instructs a power control unit within the CPU 1 to tune the real-time operating power. In an embodiment of the above operation, program code stored in the BIOS 7 that defines MMIO is shown in the following Table I:

TABLE I

```
OperationRegion (CPP2, SystemMemory, Add(\_SB.PC00.GMHB( ),0x5000), 0x1000)
  Field (CPP2, ByteAce, NoLock, Preserve)
  {
    Offset (0x9A0), // TURBO_POWER_LIMIT2 (MCHBAR+0x59A0)
    AAAA, 32,                    // Reserved for PL22
    PPL2, 15,                    // PKG_PWR_LIM_2 [46:32]
    PL2E, 1                      // PKG_PWR_LIM_EN [47]
    }
```

In addition, in an embodiment of the above operation, the program code stored in the BIOS 7 that drives the power control unit within the CPU 1 to reduce the real-time operating power is shown in the following Table II:

TABLE II

```
Method (SPL2, 0, Serialized)
{
  If (LEqual (CSEN, 1))
    {
      Return ( )
    }
    Store (1, CSEN)
    Store (PPL2, PLSA)
    Store (PL2E, PL2N)
    Store (65, PPL2)
    Store (1, PL2E)
}
```

In an embodiment, the first power level (PL1) is set to 65 W. However, in some embodiments of the present invention, it can be set to other higher or lower power levels, as can be modified within the program code provided in Table 2.

It should be particularly noted that in another preferred embodiment, after the BIOS 7 receives the power reduction signal, the BIOS 7 may reduce the real-time operating power of the CPU 1 to another operating power through the MMIO write operation. The another operating power may be higher than the first power level (PL1), for example, 75 W, so as to improve the system performance. The specific value of the another operating power can also be modified in the program code provided in Table 2.

In addition, the temperature sensor 4 continues to measure the temperature of the electronic component 2. When the temperature of the electronic component 2 falls below the threshold temperature, and the CPU 1 has been operating based on the first power level (PL1) for a specific period of time (e.g. 3 seconds), the controller 3 also sends a power tuning (recovery) signal to the BIOS 7 by using a query scheduling and completion event command (Query event command), so as to raise the real-time operating power of the CPU 1 to be close to or equal to the second power level (PL2), effectively returning the CPU 1 to its default power when operating in turbo boost mode (135 W).

In an embodiment of the above operation, the program code stored in the BIOS 7 that drives the power control unit of the CPU 1 to raise the real-time operating power is shown in the following Table III:

```
Method(RPL2,0,Serialized)
{
  Store (PLSA, PPL2)
  Store (PL2N, PL2E)
```

-continued

```
  Store (0, CSEN)
}
```

In addition, in the foregoing embodiment, the specific period of time is set to 3 seconds, but this can vary, either shorter or longer. However, it's important to find a balance, as setting the specific period of time too short might result in frequent interventions on the operation of the CPU 1, causing the protection mechanism to be overly sensitive and making system performance unstable. On the other hand, if the specific period of time is set too long, it may impact the operational efficiency of the CPU 1 and potentially lead to excessively high temperatures in the electronic component 2 due to delayed response. Therefore, the setting of the specific period of time and the threshold temperature (e.g. 90° C.) can be adjusted according to the hardware specifications and performance requirements.

Alternatively, in some embodiments, the BIOS 7 may also reduce or raise the real-time operating power through a MSR (model specific register) 11 write operation in the CPU 1. The MSR 11 may be seen in FIG. 2.

Figure 4:
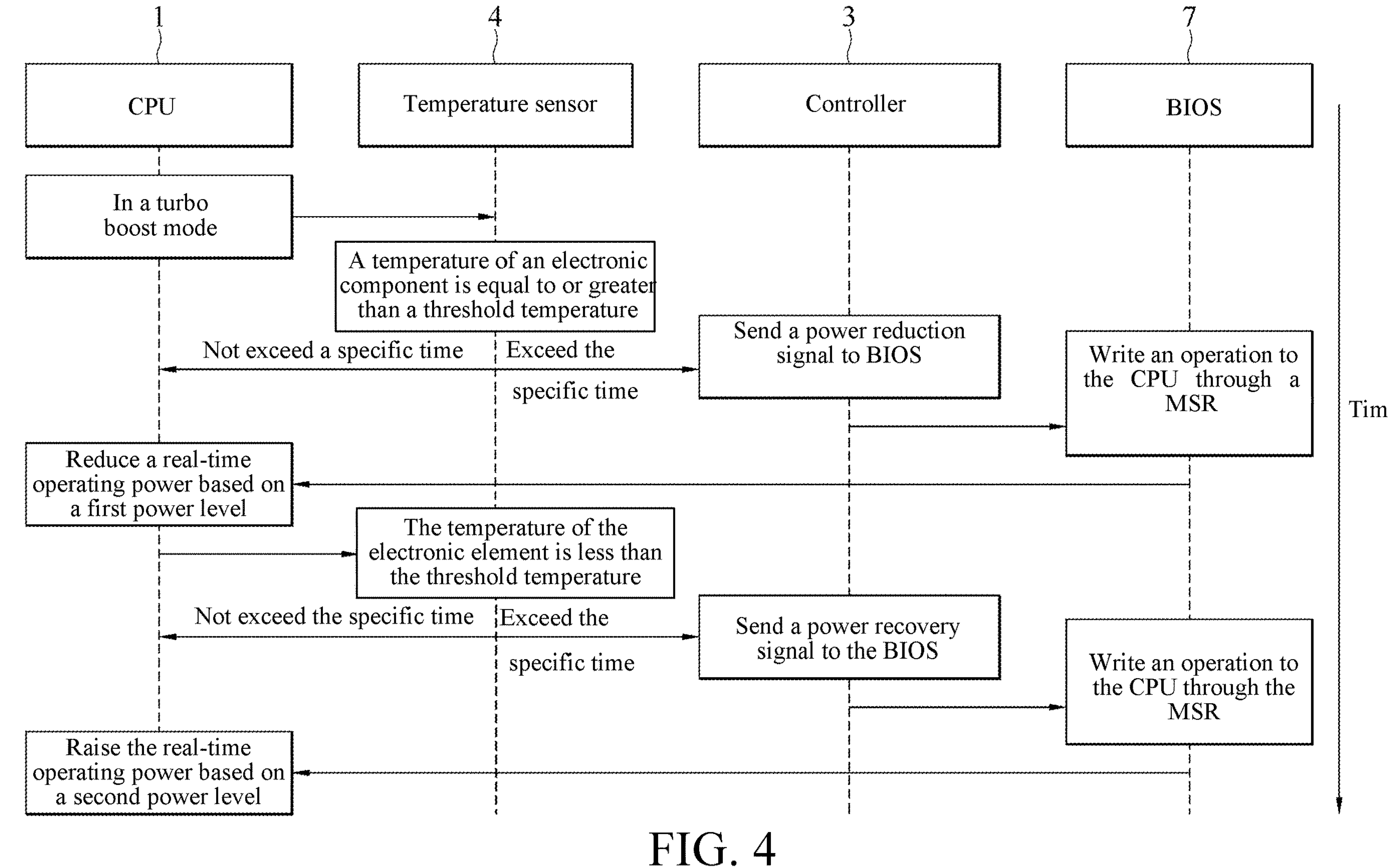
FIG. 4 is a flowchart according to another embodiment of the present invention.

Refer to FIG. 4. FIG. 4 is a flowchart of another embodiment of the present invention. The main process of the write operation using the MSR 11 is described as follows. After the controller 3 sends a power reduction signal to the BIOS 7 by using the query scheduling and completion event command (Query event command), the BIOS 7 directly performs a write operation through the MSR 11 in the CPU 1. This operation results in reducing the real-time operating power of the CPU 1 to the level specified by the first power limit (PL1). Similarly, after the controller 3 sends a power recovery signal to the BIOS 7 by using the query scheduling and completion event command (Query event command), the BIOS 7 performs a write operation through the MSR 11 in the CPU 1. This operation increases the real-time operating power of the CPU 1 to a level near or equal to the second power level (PL2). In the embodiment shown in FIG. 4, the operational processes of the CPU 1, the temperature sensor 4, and the controller 3 are similar to those described in the previous embodiment shown in FIG. 3, and the details are not described herein again.

Figure 5A:
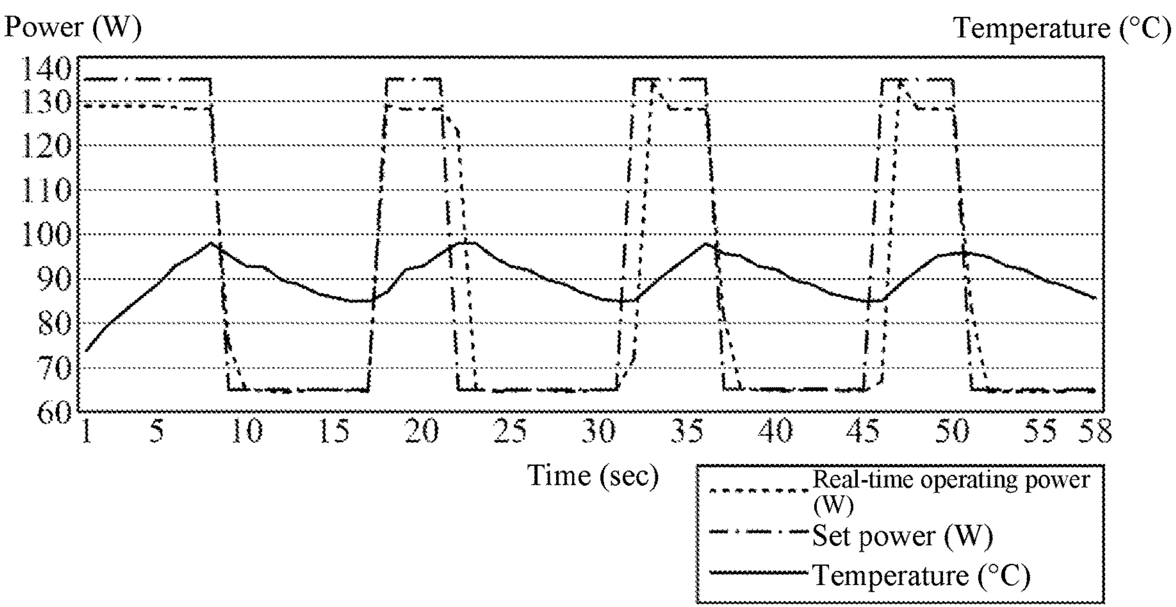
FIG. 5A is a relation diagram of powers, temperatures, and times of an embodiment of the present invention when intervening in the operation of the CPU.

Referring to FIG. 5A, FIG. 5A is a relation diagram of powers, temperatures, and times of an embodiment of the present invention when intervening in the operation of the CPU 1. It may be seen from FIG. 5A, it is observed that in this embodiment, when the CPU 1 is in the turbo boost mode, the real-time operating power of the CPU 1 is maintained at 130 W. At around the fifth second, the temperature of the electronic component 2 (see FIG. 2) exceeds 90° C. After a specific period of time (e.g. 3 seconds), at about the eighth second, the real-time operating power of the CPU 1 is reduced to approximately 65 W based on the first power level (PL1), and the temperature also begins to decrease accordingly.

Then, at around the thirteenth second, the temperature of the electronic component 2 (see FIG. 2) drops below 90° C. Subsequently, after a specific period of time (e.g. 3 seconds), the real-time operating power of the CPU 1 is increased to approximately 130 W based on the second power level (PL2) at around the sixteenth second. At this time, the temperature of the electronic component 2 starts to rise again. Subsequently, this pattern continues, operating in a cyclical manner, until the turbo boost mode of the CPU 1 is canceled.

Figure 5B:
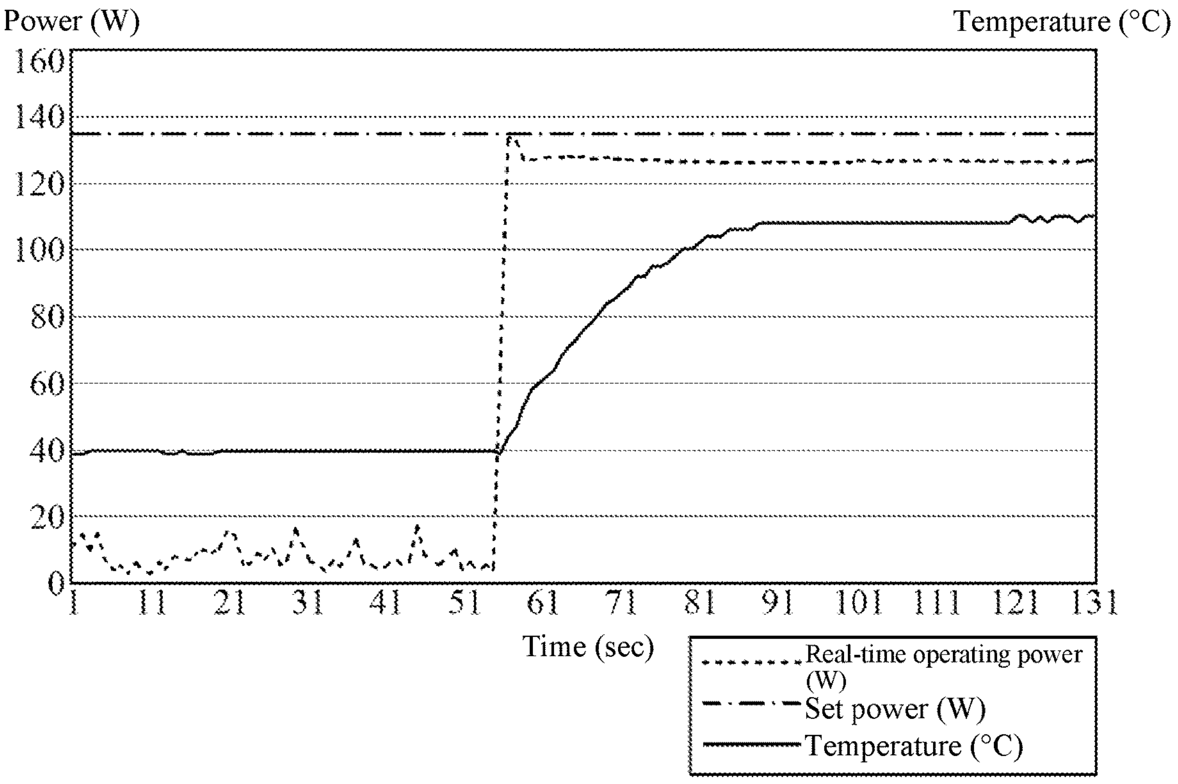
FIG. 5B is a relation diagram of powers, temperatures, and times of an embodiment of the present invention without intervening in the operation of the CPU.

Referring to FIG. 5B, FIG. 5B is a relation diagram of powers, temperatures, and times of an embodiment of the present invention without intervening in the operation of the CPU 1. As a comparative example, FIG. 5B shows that the turbo boost mode of the CPU 1 starts at the fifty-fifth second, while the temperature of the electronic component 2 (see FIG. 2) begins to rise, quickly exceeds 90° C. around the seventy-first second, subsequently reaching approximately 110° C., and remains consistently high.

Accordingly, it may be seen from FIG. 5A, when the CPU 1 is in the turbo boost mode, replacing the continuous overclocking mechanism (existing art) with power dynamic tuning mechanism (as in the embodiments described above) allows the system temperature to remain consistently below 100° C. This effectively safeguards the electronic elements 2 (as seen in FIG. 2) and circuits within the system, addressing the issue of overheating while also maintaining system performance.

For implementations involving firmware and/or software, methods may be implemented by performing the functions or steps described herein. Any machine-readable medium capable of implementing the method described herein can be used to implement the method described herein. For example, software code may be stored in a memory and executed by a processor. If implemented in firmware or software, these functions may be stored as one or more instructions or program code on computer-readable storage media. The computer-readable media may include a RAM, a ROM, an electrically erasable programmable read-only memory (EEPROM), a compact disc read-only memory (CD-ROM), or another optical disk storage, magnetic disk storage, semiconductor storage, or another storage device, or any other media that may be configured to store required code in the form of instructions or data structures in a form readable and accessible by a computer.

Based on the above, to provide temperature protection for all components on the motherboard, in some embodiments of the present invention, the operating state of the CPU 1 may be forcibly intervened, disregarding the turbo boost mechanism of the CPU 1, to reduce the real-time operating power of the CPU 1, without the interference of the upper limit of the turbo boost operating power (the second power level) and the Tau parameter, so as to reduce the temperature of electronic components.

On the other hand, if the CPU 1 is still in the turbo boost mode and the temperature of the electronic component 2 is below than the threshold temperature, the system may allow the CPU 1 to restore the turbo boost operating power (the second power level) to further enhance the system performance. In this way, according to some embodiments of the present invention, the operating power of the CPU 1 in the turbo boost mode can be dynamically tuned while balancing system performance and stability. This approach prevents electronic components from causing system crashes or failures due to high temperatures and fulfills the need for maximizing system performance and reducing costs.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for dynamically tuning thermal design power (TDP), the method comprising:

sending, by a controller, a power tuning signal to a BIOS in response to a temperature of an electronic component being equal to or greater than a threshold temperature while a CPU is operating in a turbo boost mode; and performing, by the BIOS, a thermal design power setting to reduce a real-time operating power of the CPU.

2. The method for dynamically tuning thermal design power according to claim 1, wherein the thermal design power setting comprises a first power level and a second power level, and the BIOS is configured to cause the CPU to reduce the real-time operating power based on the first power level.

3. The method for dynamically tuning thermal design power according to claim 2, wherein the BIOS is configured to cause the CPU to raise the real-time operating power based on the second power level in response to the temperature of the electronic component being less than the threshold temperature and the CPU operating based on the first power level for a specific period of time.

4. The method for dynamically tuning thermal design power according to claim 2, wherein the BIOS is configured to cause the CPU to reduce the real-time operating power based on the first power level through a MMIO write operation.

5. The method for dynamically tuning thermal design power according to claim 2, wherein the BIOS is configured to cause the CPU to reduce the real-time operating power based on the first power level through a MSR write operation.

6. The method for dynamically tuning thermal design power according to claim 1, wherein the controller is configured to send the power tuning signal to the BIOS by using a query scheduling and completion event command (QUERY EVENT command).

7. The method for dynamically tuning thermal design power according to claim 1, wherein the controller is an embedded controller, and is configured to obtain the temperature of the electronic component through a temperature sensor.

8. A system for dynamically tuning thermal design power, configured to dynamically tune turbo boost mode operation parameters of a CPU, the system comprising:

a controller; and a BIOS, electrically coupled to the controller and the CPU, wherein the BIOS is configured to perform a thermal design power setting to reduce a real-time operating power of the CPU in response to the controller sending a power tuning signal to the BIOS in response to a temperature of an electronic component being equal to or greater than a threshold temperature while the CPU is operating in a turbo boost mode.

9. The system for dynamically tuning thermal design power according to claim 8, further comprising a temperature sensor electrically coupled to the controller, wherein the controller is configured to measure the temperature of the electronic component through the temperature sensor, and send the power tuning signal to the BIOS based on the temperature of the electronic component.

10. The system for dynamically tuning thermal design power according to claim 9, wherein the controller is an embedded controller, and comprises a temperature reading unit, a comparison unit, and a control unit; the temperature reading unit is configured to measure the temperature of the electronic component through the temperature sensor, the comparison unit is configured to compare the threshold temperature with the temperature of the electronic component, and the control unit is configured to send the power tuning signal to the BIOS.

11. The system for dynamically tuning thermal design power according to claim 9, wherein the thermal design power setting comprises a first power level and a second power level, and the BIOS is configured to cause the CPU to reduce the real-time operating power based on the first power level.

12. The system for dynamically tuning thermal design power according to claim 11, wherein the BIOS is configured to cause the CPU to raise the real-time operating power based on the second power level in response to the temperature of the electronic component being less than the threshold temperature and the CPU operating at the first power level for a specific period of time.

13. The system for dynamically tuning thermal design power according to claim 11, wherein the BIOS is configured to cause the CPU to reduce the real-time operating power based on the first power level through a MMIO write operation.

14. The system for dynamically tuning thermal design power according to claim 11, wherein the BIOS is configured to cause the CPU to reduce the real-time operating power based on the first power level through a MSR write operation.

15. A non-transitory computer-readable storage medium, storing instructions, the instructions being executed by a controller in response to a CPU is in a turbo boost mode to cause the controller to perform operations comprising:

sending a power tuning signal to a BIOS in response to a temperature of an electronic component being equal to or greater than a threshold temperature, and performing, by the BIOS, a thermal design power (TDP) setting to reduce a real-time operating power of the CPU.

16. The non-transitory computer-readable storage medium according to claim 15, wherein the thermal design power setting comprises a first power level and a second power level, and the BIOS is configured to cause the CPU to reduce the real-time operating power based on the first power level.

17. The non-transitory computer-readable storage medium according to claim 16, wherein the BIOS is configured to cause the CPU to raise the real-time operating power based on the second power level in response to the temperature of the electronic component being less than the threshold temperature and the CPU operating based on the first power level for a specific period of time.

18. The non-transitory computer-readable storage medium according to claim 16, wherein the BIOS is configured to cause the CPU to reduce the real-time operating power based on the first power level through a MMIO write operation.

19. The non-transitory computer-readable storage medium according to claim 16, wherein the BIOS is configured to cause the CPU to reduce the real-time operating power based on the first power level through a MSR write operation.

20. The non-transitory computer-readable storage medium according to claim 15, wherein the controller is an embedded controller, and is configured to obtain the temperature of the electronic component through a temperature sensor, and send the power tuning signal to the BIOS by using a query scheduling and completion event command (QUERY EVENT command).

* * * * *